(12) United States Patent
Mori et al.

(10) Patent No.: US 7,876,648 B2
(45) Date of Patent: Jan. 25, 2011

(54) OPTICAL PICK-UP CAPABLE OF ELIMINATING STRAY BEAMS

(75) Inventors: Kazushi Mori, Hirakata (JP); Katsutoshi Hibino, Kaizu (JP); Naoyuki Takagi, Fuwa-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 509 days.

(21) Appl. No.: 11/945,673

(22) Filed: Nov. 27, 2007

(65) Prior Publication Data

US 2008/0123492 A1  May 29, 2008

(30) Foreign Application Priority Data

Nov. 27, 2006  (JP)  ............................... 2006-318004

(51) Int. Cl.
G11B 7/00  (2006.01)
(52) U.S. Cl. ............................... 369/44.14; 369/112.16
(58) Field of Classification Search ............. 369/44.11, 369/44.12, 44.21, 44.19, 44.23, 112.01, 112.05, 369/112.06, 112.08, 112.11, 112.03, 112.13, 369/44.14

See application file for complete search history.

(56) References Cited

U.S. PATENT DOCUMENTS

| 6,125,087 A * | 9/2000 | Ohnishi et al. | 369/44.23 |
| 6,208,610 B1 * | 3/2001 | Kawakami et al. | 369/112.01 |
| 6,928,035 B2 * | 8/2005 | Komma et al. | 369/44.37 |
| 7,236,443 B2 * | 6/2007 | Martynov et al. | 369/112.01 |
| 2004/0165518 A1 * | 8/2004 | Horimai et al. | 369/94 |
| 2007/0104072 A1 * | 5/2007 | Ogata | 369/112.16 |
| 2008/0101202 A1 * | 5/2008 | Nishimoto et al. | 369/112.07 |
| 2010/0135143 A1 * | 6/2010 | Ogata | 369/109.01 |

FOREIGN PATENT DOCUMENTS

| JP | 2005-063595 | | 3/2005 |
| JP | 2005-63595 A | | 3/2005 |
| JP | 2006-260669 | | 9/2006 |
| JP | 2006-260669 A | | 9/2006 |
| JP | 2007-141357 | * | 6/2007 |

* cited by examiner

Primary Examiner—Tan X Dinh
(74) Attorney, Agent, or Firm—Ditthavong Mori & Steiner, P.C.

(57) ABSTRACT

An optical element is disposed on an optical path between a beam branching element and a photodetector. The optical element is disposed at a focal position of a stray light beam reflected by a recording layer except a target recording layer, and shields or attenuates the light beam in a region where the stray light beam converges.

3 Claims, 17 Drawing Sheets

OPTICAL PICK-UP CAPABLE OF ELIMINATING STRAY BEAMS

This application claims priority under 35 U.S.C. Section 119 of Japanese Patent Application No. 2006-318004 filed Nov. 27, 2006, entitled "OPTICAL PICKUP DEVICE".

BACKGROUND OF THE INVENTION

1. Field of the Invention

The present invention relates to optical pickup devices, and more particularly, to an optical pickup device suitably used to irradiate laser light on a disk in which a plurality of recording layers are laminated.

2. Description of the Related Art

An optical pickup device for focusing a laser beam onto a disk recording surface is arranged in an optical disk drive which records and reproduces information in and from an optical disk such as a CD (Compact Disc) and a DVD (Digital Versatile Disc).

FIG. 9 shows a basic configuration of the optical pickup device. In FIG. 9, the numeral 11 designates a semiconductor laser, the numeral 12 designates a diffraction grating, the numeral 13 designates a beam splitter, the numeral 14 designates a collimator lens, the numeral 15 designates an objective lens, the numeral 16 designates a cylindrical lens, and the numeral 17 designates a photodetector.

The laser beam emitted from the semiconductor laser 11 is divided into a main beam (0-order diffraction light) and two sub-beams (±1-order diffraction light) by the diffraction grating 12, and the light beams are incident on the beam splitter 13. The laser beams transmitted through the beam splitter 13 are converted into substantially parallel light by the collimator lens 14, and the laser beams are focused on the disk recording surface by the objective lens 15.

The light reflected from the disk reversely proceeds the optical path in which the light is incident on the disk, and the light is partially reflected by the beam splitter 13. After astigmatism is introduced by the cylindrical lens 16, the light is focused on a light receiving surface of the photodetector 17. In the configuration shown in FIG. 9, an astigmatism method is adopted as a technique of detecting focus error.

FIG. 10A shows an arrangement of spots of the three beams (main beam and sub-beams) on the disk recording surface. FIG. 10A shows the state where the three beams are focused on the disk on which grooves and lands are arranged.

As shown in FIG. 10A, in the recording and reproducing operation, the main beam is focused on a groove and the two sub-beams are separately focused on lands which sandwich the groove from both sides. The spots of FIG. 10A are arranged to perform good tracking error detection by a differential push-pull method to be described later.

FIG. 10B shows light intensity distribution of the main beam and two sub-beams on the disk recording surface.

The recording in the disk is performed only by the main beam and the two sub-beams are used to generate a tracking error signal and a focus error signal. Light intensity of the main beam is set much higher than light intensity of the sub-beams. This is because a laser output from the semiconductor laser 11 is efficiently utilized in the recording. A recording speed to the disk can be higher as the laser beam intensity is increased on the recording surface. Therefore, the laser output from the semiconductor laser 11 is divided into the main beam and the sub-beams such that an intensity portion of the main beam used in the recording is much higher than those of the sub-beams.

A light intensity ratio between the main beam and the sub-beam is determined by diffraction efficiency (usually grating depth) of the diffraction grating 12. Usually the main beam intensity is 10 to 18 times the sub-beam intensity. The ratio is directly reflected on an intensity ratio between the main beam and the sub-beam on the light receiving surface of the photodetector 17.

FIG. 11A illustrates a principle of tracking error detection by the differential push-pull method.

Referring to FIG. 11A, the numerals 171, 172, and 173 designate a quadrant sensor arranged on the photodetector 17. The main beam is accepted by the quadrant sensor 171, and the two sub-beams accepted by the quadrant sensors 172 and 173 respectively. FIG. 11A shows focusing spots of the main beam and the sub-beam located on the quadrant sensors 171, 172, and 173. Light intensity distribution is schematically shown in each spot, and hatching is performed such that the color is brought close to black as the light intensity is increased.

As shown in FIG. 11A, the letters A to L designate sensor units of the quadrant sensors 171, 172, and 173 respectively. Assuming that PA to PL are detection outputs of the sensor units A to L, a differential push-pull signal (DPP) is given by the following equation.

$$DPP = \{(PA+PB)-(PC+PD)\} - k1 \cdot \{(PE+PF+PI+PJ) - (PG+PH+PK+PL)\} \quad (1)$$

At this point, the coefficient $k1$ corresponds to a sensitivity multiplying factor of a sub-light receiving unit, and the coefficient $k1$ is set such that the detection output of the main beam is equal to the summation of the detection outputs of the sub-beams.

As shown in FIG. 10A, when the main beam is in the state where the main beam is focused at the center position of the track (groove), the main beam and two sub-beams located on the light receiving surface of the photodetector 17 become the spot states shown in part (a-2) of FIG. 11A. In this case, the light intensity distribution of each spot becomes symmetry in relation to one parting line of the quadrant sensor. Accordingly, when the computation is performed by the equation (1), the differential push-pull signal (DPP) becomes zero.

When the main beam is displaced in the radial direction (vertical direction in the paper plane) from the state shown in FIG. 10A, the main beam and two sub-beams located on the light receiving surface of the photodetector 17 become the spot states shown in part (a-1) or (a-3) of FIG. 11A. Parts (a-1) and (a-3) of FIG. 11A shows the states in which the main beam generates track shift from the center of the track toward an outer circumference direction and an inner circumference direction of the disk respectively.

In this case, the light intensity distribution of the main beam and two sub-beams located on the light receiving surface become the state in which the light intensity distribution is biased in the horizontal direction of the paper plane. As can be seen from comparison of parts (a-1) and (a-3) of FIG. 11A, the bias direction of the light intensity distribution in each spot becomes opposite according to the track shift direction of the main beam. The main beam differs from the sub-beam in that the direction in which the light intensity is biased is opposite.

The reason why the direction in which the light intensity is biased is not orthogonal to the direction in which the three spots are arranged (track direction) is that the intensity distribution within the spot is transformed by 90 degrees by the astigmatic action.

When the computation is performed by the equation (1), the differential push-pull signal (DPP) becomes a negative value in the state shown in part (a-1) of FIG. 11A, and becomes a positive value in the state shown in part (a-3). Accordingly, the track shift of the main beam on the disk can be detected based on the differential push-pull signal (DPP).

In a so-called one-beam push-pull method, a push-pull signal is generated only from the main beam, and the track shift of the main beam is detected based on the push-pull signal. However, in the one-beam push-pull method, a DC offset is generated in the push-pull signal due to inclination of the disk and an optical axis shift of the objective lens, which results in degradation of accuracy of track shift detection. On the other hand, in the differential push-pull method, the DC offset is cancelled by the computation of the equation (1), so that the accuracy of track shift detection can be enhanced.

FIG. 11B illustrates a principle of focus error detection by the differential astigmatism method. In this case, the focusing spots of the main beam and two sub-beams located on the light receiving surface of the photodetector 17 are changed from a perfect circle to an ellipse according to a focus shift.

When the main beam is focused on the disk recording surface, the spot shapes of the main beam and two sub-beams located on the light receiving surface of the photodetector 17 become substantially a perfect circle as shown in part (b-2) of FIG. 11B. On the other hand, when the focal position of the main beam is shifted forward and backward with respect to the disk recording surface, the spot shapes of the main beam and two sub-beams located on the light receiving surface of the photodetector 17 are deformed as shown in part (b-1) or (b-3) of FIG. 11B.

In this case, a differential astigmatism signal (DAS) is obtained by the following equation.

$$DAS=\{(PA+PC)-(PB+PD)\}-k2\cdot\{(PE+PG+PI+PK)-(PF+PH+PJ+PL)\} \quad (2)$$

where k2 is a coefficient which has the same meaning as k1.

In the on-focus state shown in part (b-2) of FIG. 11B, because the main beam and two sub-beams located on the light receiving surface of the photodetector 17 have the spot shape of substantially perfect circle, when the computation of the equation (2) is performed, the differential astigmatism signal (DAS) becomes zero. On the contrary, when the focal position of the main beam is shifted forward and backward from the recording surface, the spot shape of each beam is deformed into an ellipse in a different direction depending on the focus shift direction as shown in parts (b-1) and (b-3) of FIG. 11B. Therefore, when the computation of the equation (2) is performed, the differential astigmatism signal (DAS) becomes sometimes negative ((b-1) of FIG. 11B), and sometimes positive ((b-3) of FIG. 11B). Accordingly, the focus shift of the main beam on the disk recording surface can be detected based on the differential astigmatism signal (DAS).

As with the track shift detection, in the focus shift detection, the focus error signal can be generated only from the main beam. However, when the focus error signal is generated only from the main beam, the push-pull signal is superposed as a noise on the focus error signal in traversing the track of the spot on the disk, which results in a problem that a good focus error signal cannot be obtained. On the contrary, in the differential astigmatism method, because the push-pull signal which is a noise is cancelled by the computation of the equation (2), the good focus error signal can be obtained.

Thus, in order to enhance the accuracy of tracking error signal and focus error signal, the detection signal based on the sub-beam plays a significant role.

A disk (hereinafter referred to as "multi-layer disk") in which a plurality of recording layers are laminated has been developed and commercialized in response to a demand of recording large-capacity information in the disk. In the next-generation DVD which is currently being commercialized, the recording layers can be laminated corresponding to a blue laser beam having a wavelength of about 400 nm.

The differential push-pull method and the differential astigmatism method can be adopted even in this kind of multi-layer disks. However, when these techniques are used on the multi-layer disk, the light (stray light) reflected from the recording layer except the recording layer of the recording and reproducing target is incident on the photodetector 17, which results in a problem of lowering the accuracy of focus error signal and tracking error signal. This is so-called a problem of signal degradation caused by the stray light.

FIGS. 12A and 12B show a stray light generation state where a laser beam is focused on a multi-layer disk having two recording layers. In FIGS. 12A and 12B, the signal light (light reflected from the recording layer which is of the recording and reproducing target) is shown with a solid line, and the stray light is shown with a broken line.

FIG. 12A shows a state in which the laser beam emitted from the optical pickup device is focused on a recording layer L1. In this case, the light which is transmitted through the recording layer L1 and reflected from a recording layer L0 becomes the stray light. Because the light reflected from the recording layer L0 becomes divergent light whose starting point is located farther than the recording layer L1 with respect to the objective lens 15, the light becomes a slightly focused state compared with the parallel light, after transmitted through the objective lens 15. Accordingly, because the focal point by the collimator lens 14 is brought close to the disk side of the light receiving surface of the photodetector 17, the spot becomes a widely spread spot on the light receiving surface of the photodetector 17.

FIG. 12B shows a state in which the laser beam emitted from the optical pickup device is focused on the recording layer L0. In this case, the light reflected from the recording layer L1 becomes the stray light. Because the light reflected from the recording layer L1 becomes divergent light whose starting point is located closer to the objective lens 15 compared with the recording layer L0, the light becomes a slightly divergent state compared with the parallel light, after transmitted through the objective lens 15. Accordingly, because the focal point by the collimator lens 14 is separated from the disk with respect to the light receiving surface of the photodetector 17, the spot becomes a widely spread spot on the light receiving surface of the photodetector 17.

FIG. 13 shows an irradiation state of the stray light on the light receiving surface of the photodetector 17. In this case, the light receiving surface is irradiated with the stray light such that all the quadrant sensors 171, 172, and 173 are covered with the stray light. There are three stray light beams including the stray light based on the main beam and the stray light based on the two sub-beams, the stray light of the sub-beam is also incident on the light receiving surface while overlapping the stray light of the main beam. However, the stray light of the sub-beam has light intensity which has little influence on the focus error signal and tracking error signal, so that only the stray light of the main beam is shown in FIG. 13 for convenience sake.

FIG. 14 shows light intensity distribution of the signal light and the stray light on the light receiving surface of the photodetector 17. As shown in FIG. 12, peak intensity of the stray light is considerably lower than peak intensity of the signal light of the main beam. Therefore, the stray light has little influence on the signal light of the main beam. On the other hand, because the stray light intensity at the position of the sub-beam is close to the intensity of the signal light of the sub-beam, sometimes a behavior of the stray light has a strong influence on the sub-beam detection signal.

As described above, the sub-beam plays a significant role in enhancing the accuracy of tracking error signal and focus error signal. Therefore, when the light intensity of the stray light is brought close to the intensity of the sub-beam signal light, the sub-beam has a large influence on the tracking error signal and focus error signal, which causes a risk of remarkably deteriorating performance of the optical pickup device as a whole.

Therefore, the following techniques are proposed to solve the problem.

FIG. 15A shows a configuration of the optical pickup device according to a first technique. In the configuration example of FIG. 15A, a light shielding member is inserted into an optical path of the laser beam, and the stray light is blocked by a light shielding portion provided on the light shielding member. At this point, FIG. 15B shows the spot states of the main beam and sub-beam and the stray light irradiation state on the light receiving surface of the photodetector.

As shown in FIG. 15B, in the configuration example, the stray light is prevented from entering the quadrant sensor. However, at the same time, because part of the signal light is also blocked by the light shielding portion, a region (shown by "N" in FIG. 15B) where the reflected light is lost is generated in the spots of the main beam and of the sub-beam on the light receiving surface of the photodetector. Particularly, the lost region in the spot of the main beam signal light becomes a problem. That is, the lost region in the spot of the main beam signal light is generated in the central portion of the spot having strong light intensity, which results in a problem of remarkably lowering quality of the RF signal or the focus error signal.

FIG. 16 shows a configuration example of an optical pickup device according to a second technique. In the configuration of FIG. 16, a pinhole is made at a focal position of the signal light beam to guide only the signal light beam onto the photodetector through the pinhole.

FIGS. 17A and 17B are diagrams showing states of the convergent spots on the photodetector in the configuration of the second technique. FIG. 17A shows a state in which the pinhole is made only at the focal position of the main beam. In FIG. 17A, obviously, the sub-beams are eliminated on the photodetector. FIG. 17B shows a state in which the pinholes are made at the focal positions of the main beam and sub-beams respectively. In FIG. 17B, although the sub-beams (signal light beams) are not eliminated on the photodetector, accurate alignment of the pinholes is required with respect to the three beams. Therefore, it is difficult to adjust the positions of the pinholes. Additionally, because the stray light beams also pass through the pinholes, the photodetector is irradiated with the stray light beam as shown in FIG. 17B. In this case, the regions of the photodetector irradiated with the stray light beams can be decreased by reducing the diameters of the pinholes. However, at the same time, the allowable error is decreased in adjusting the pinholes and focal positions of the main beam and sub-beams, which results in a problem that it becomes difficult to adjust the positions.

SUMMARY OF THE INVENTION

An optical pickup device according to an aspect of the present invention includes a light source which emits the laser beam; an objective lens which causes the laser beam emitted from the light source to converge onto a target recording layer among the plurality of recording layers; a beam branching element which separates the laser beam emitted from the light source and reflected light beams reflected by the recording layers; a photodetector for receiving the reflected light beam from the target recording layer; and an optical element disposed at a focal position of a stray light beam which is the reflected light beam from the recording layer except the target recording layer, on an optical path between the beam branching element and the photodetector to cause a different optical operation from surrounding regions to the reflected light beams in a convergent region of the stray light beam in the incident reflected light beams.

In the optical pickup device according to the aspect of the present invention, the incidence of the stray light beam on the photodetector is suppressed by the action of the optical element. At this point, although the signal light beam (light beam reflected from the target recording layer) is also shielded or attenuated by the optical element, the region where the signal light beam is incident on the optical element is sufficiently wider than the region where the stray light beam converges, so that the decrease in light quantity of the signal light beam by the optical element is suppressed to a low level. Therefore, the detection accuracy of the focus error and tracking error hardly deteriorates by the decrease in light quantity.

BRIEF DESCRIPTION OF THE DRAWINGS

The above and other objects and features of the present invention will be fully apparent from the following description of embodiments taken in conjunction with the accompanying drawings.

However, the drawings are used for illustration by way of example, and the present invention is not limited by the drawings.

DESCRIPTION OF THE PREFERRED EMBODIMENTS

Preferred embodiments of the present invention will be described below with reference to the drawings.

First Embodiment

Figure 1:
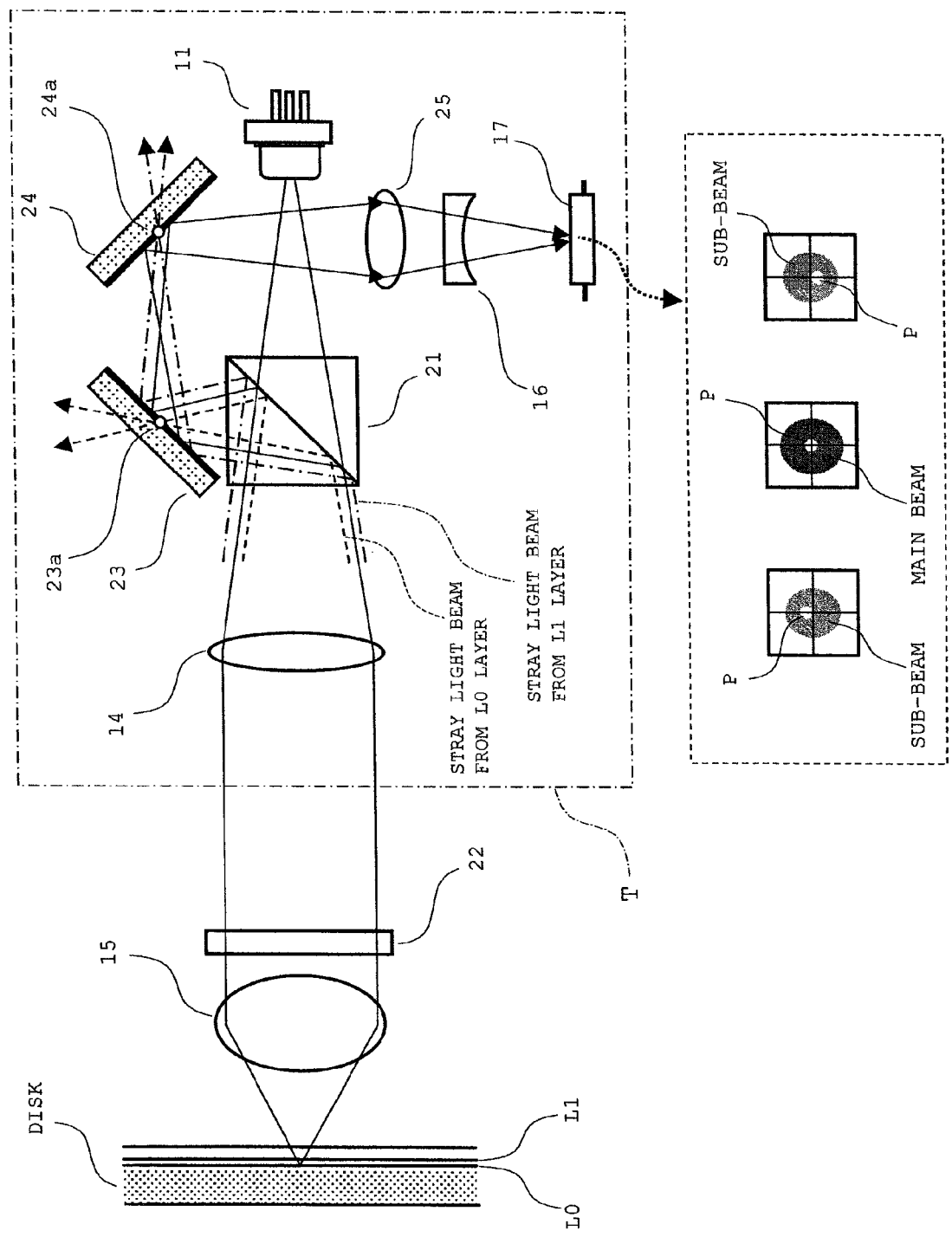
FIG. 1 shows a configuration of an optical pickup device according to a first embodiment of the present invention.
Figure 9:
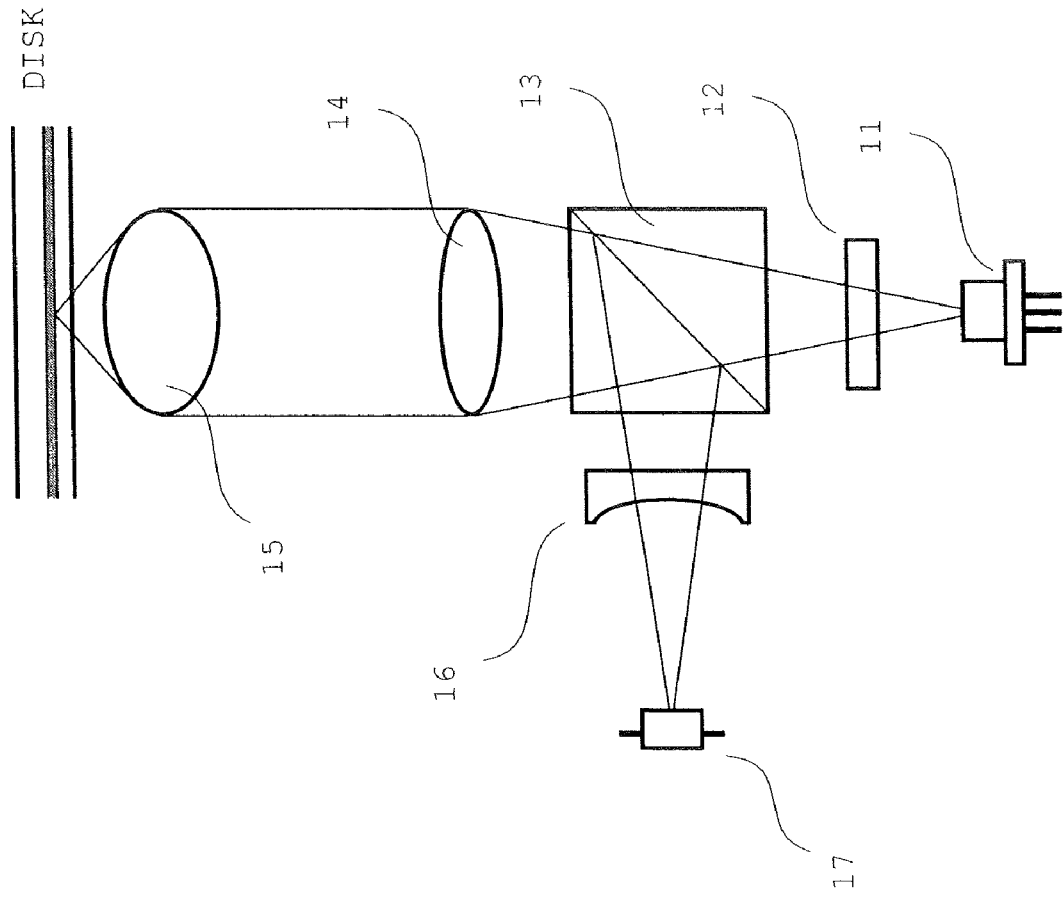
FIG. 9 shows a configuration of an optical pickup device according to the related art.
Figure 10B:
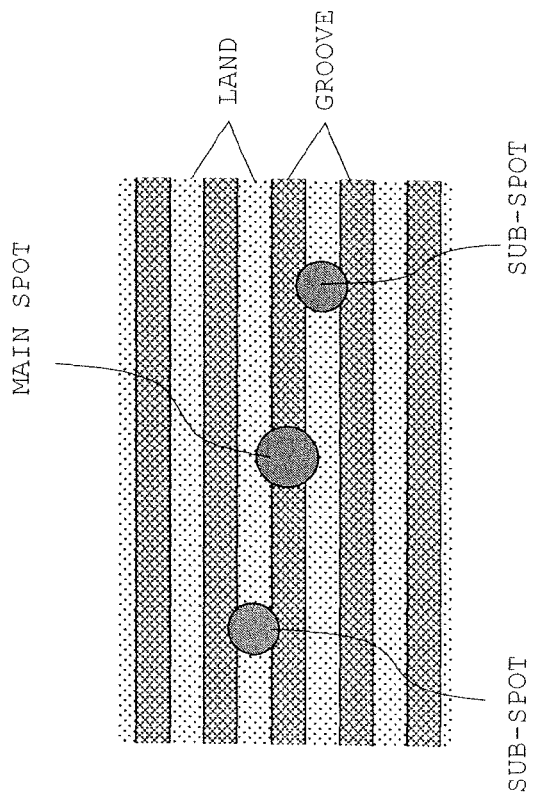
FIGS. 10A and 10B show a laser beam irradiation state on an optical disk and light intensity distribution according to the related art.
Figure 10A:
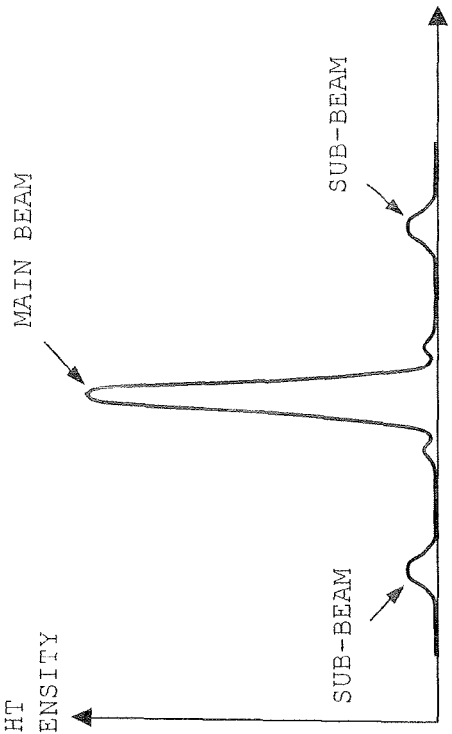
Figure 11A:
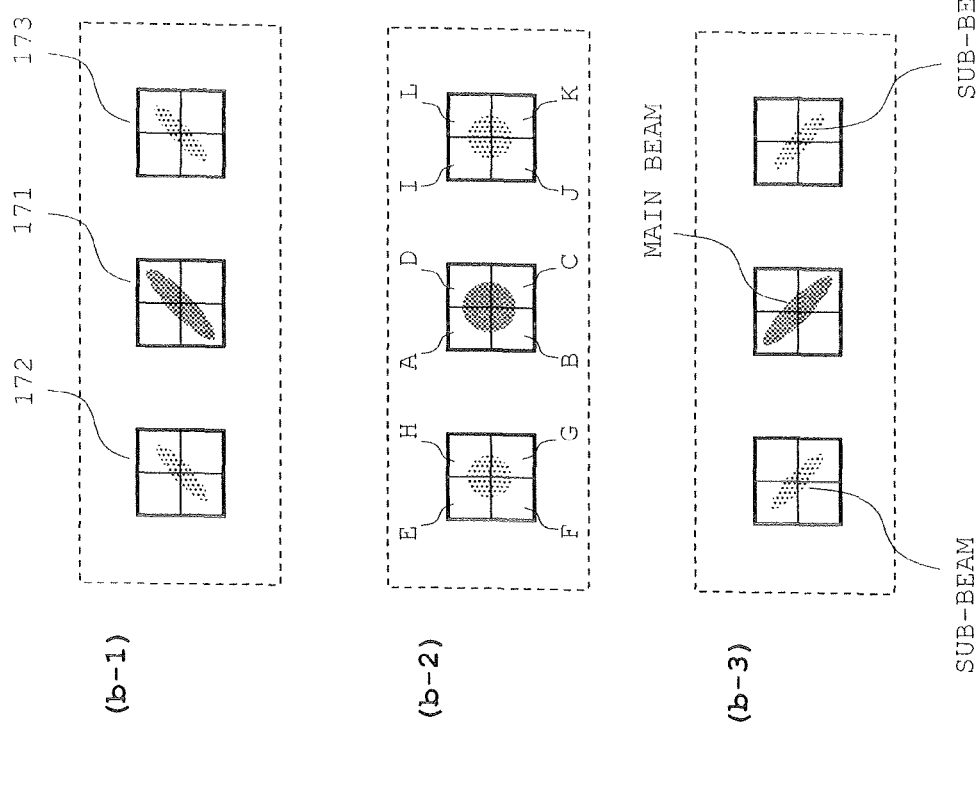
FIGS. 11A and 11B show states of a main beam and sub-beams on the optical pickup device according to the related art.
Figure 11B:
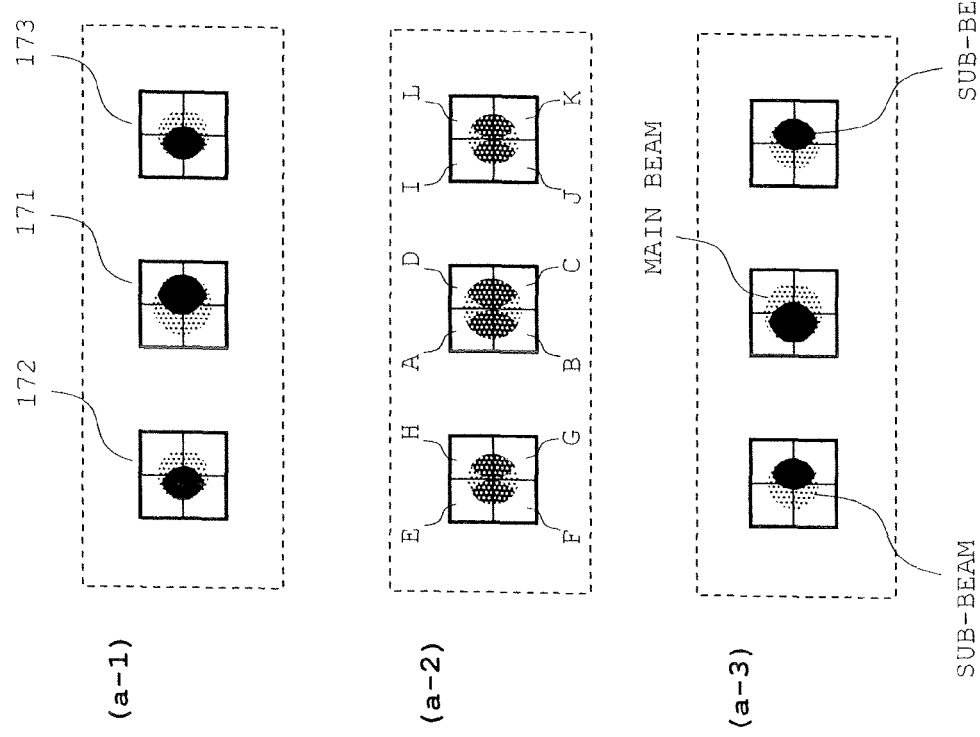
Figure 12B:
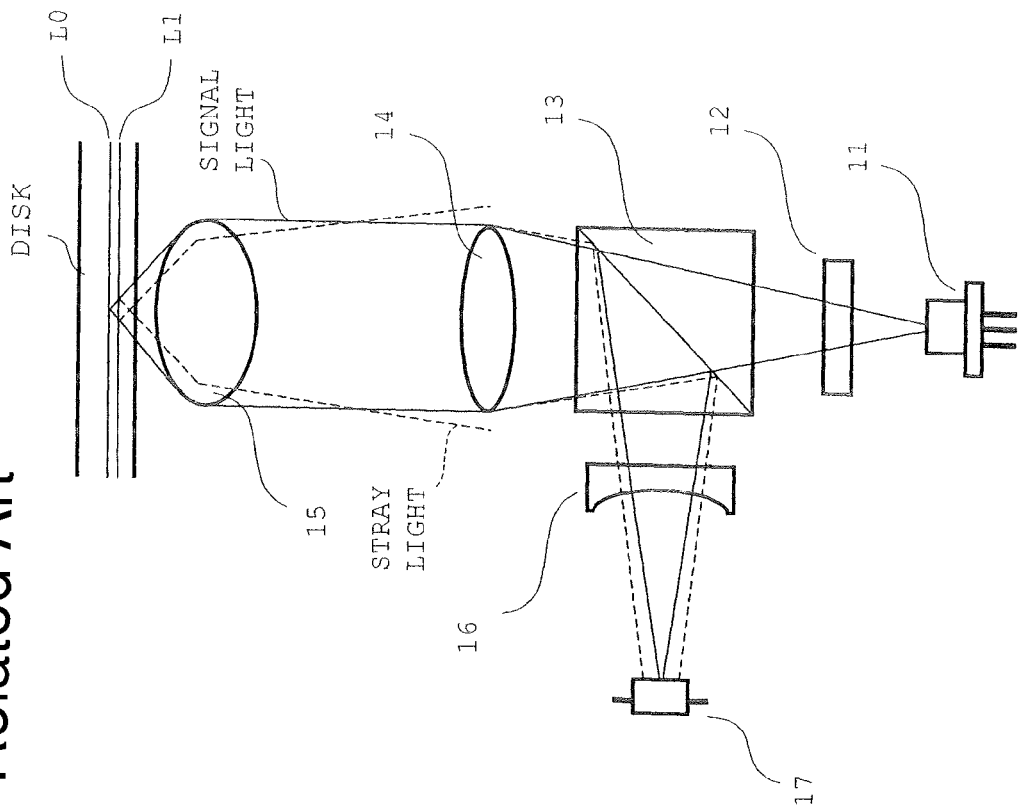
FIGS. 12A and 12B are diagrams illustrating an optical path of a stray light beam according to the related art.
Figure 12A:
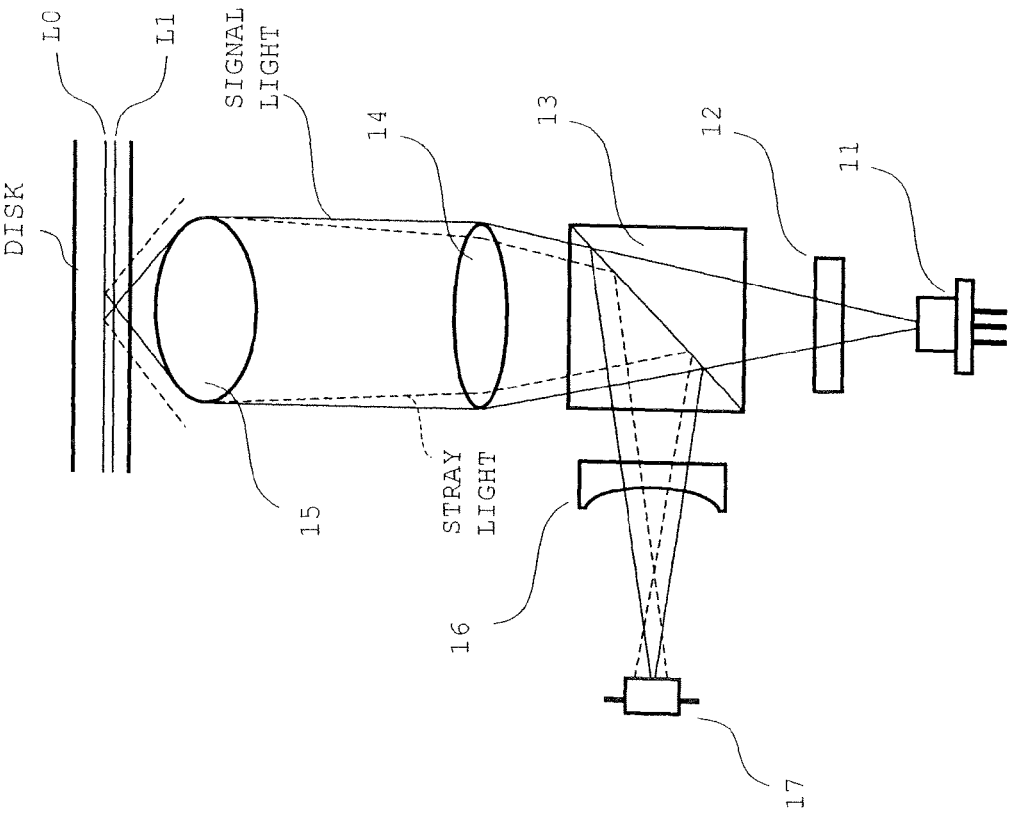
Figure 13:
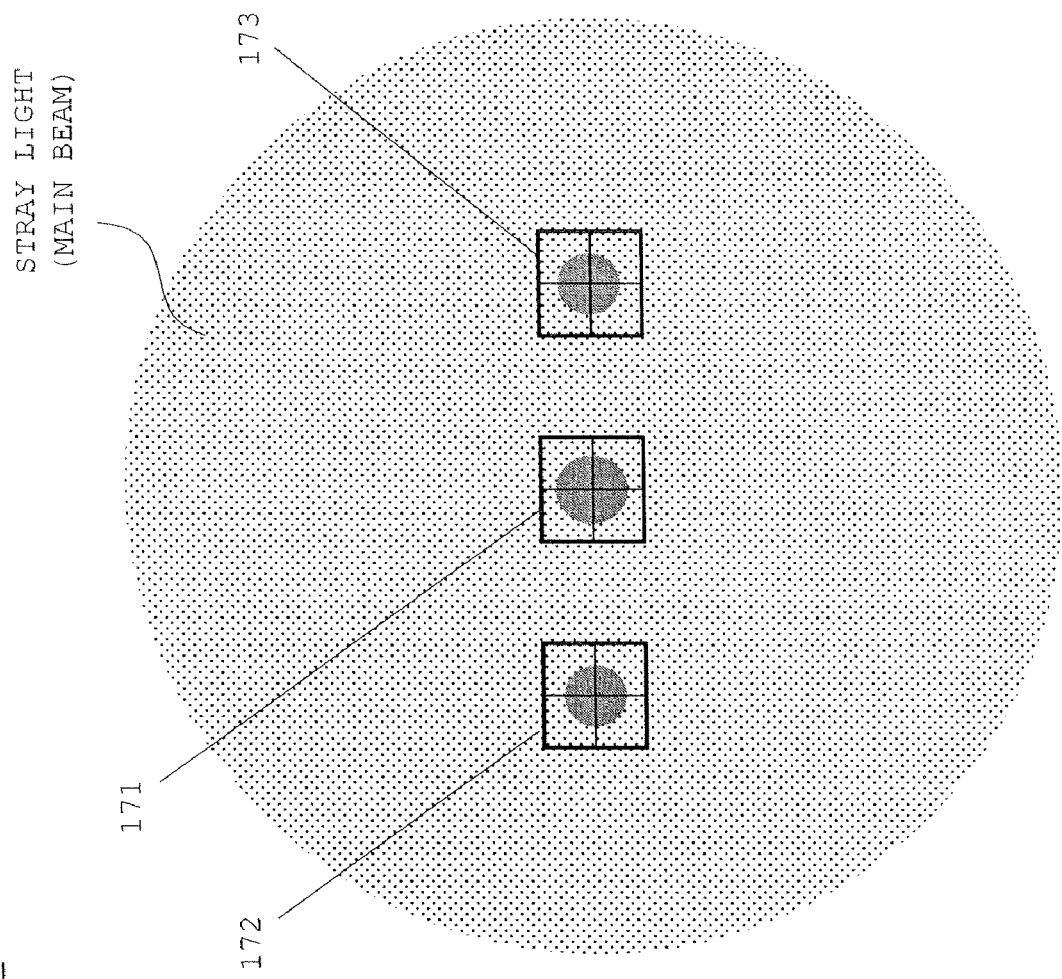
FIG. 13 shows a stray light beam irradiation state according to the related art.
Figure 14:
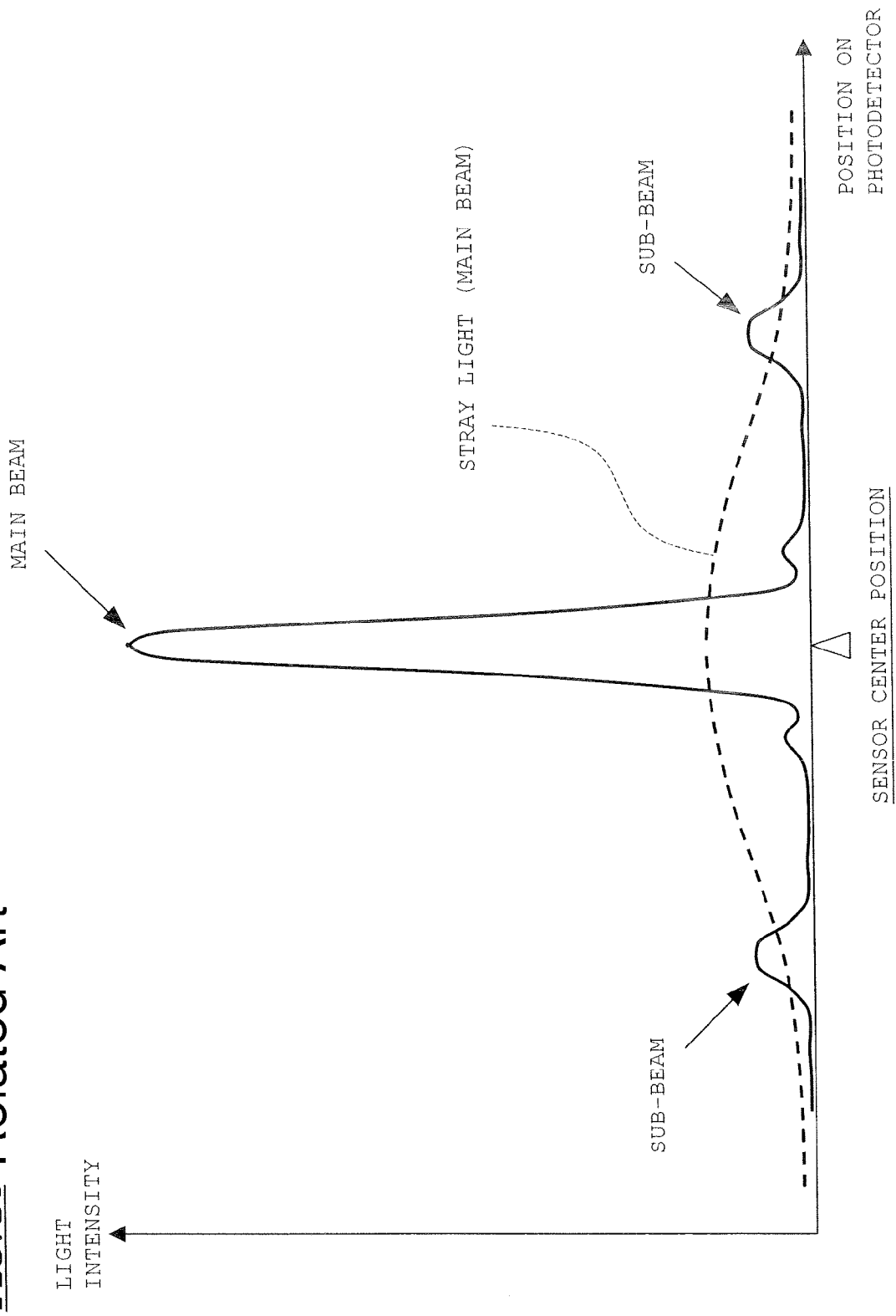
FIG. 14 shows light intensity distribution of the signal light beam and stray light beam according to the related art.
Figure 15B:
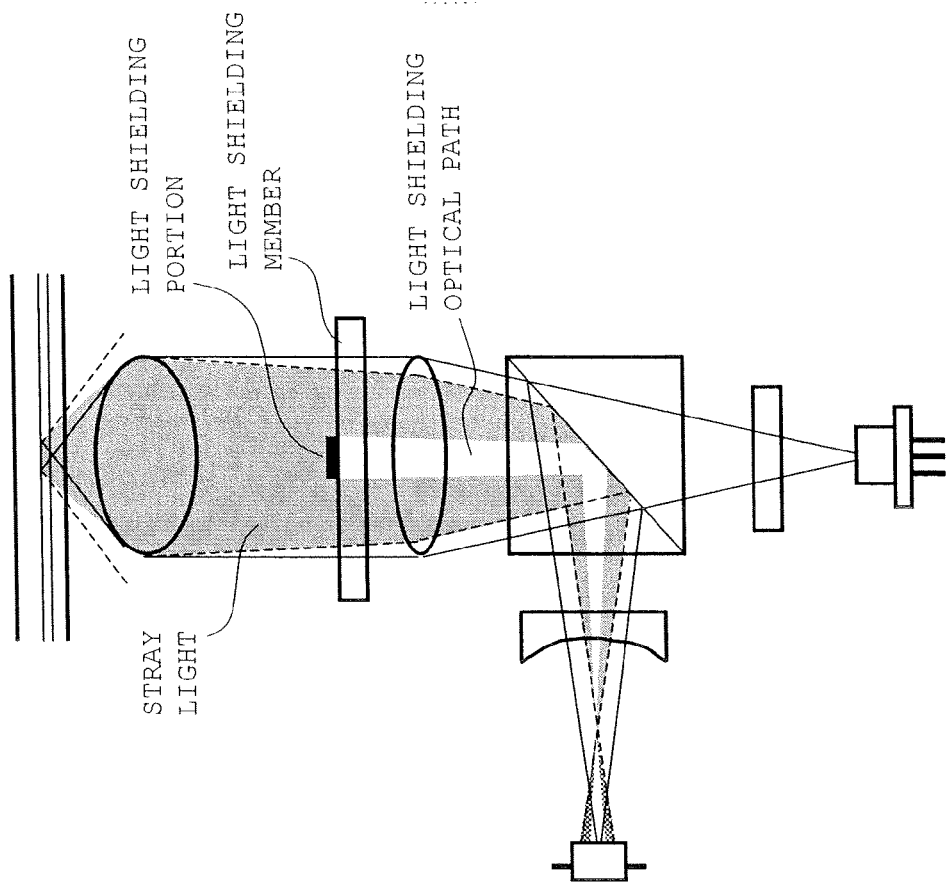
FIGS. 15A and 15B are diagrams illustrating a stray light beam suppression technique according to the related art.
Figure 15A:
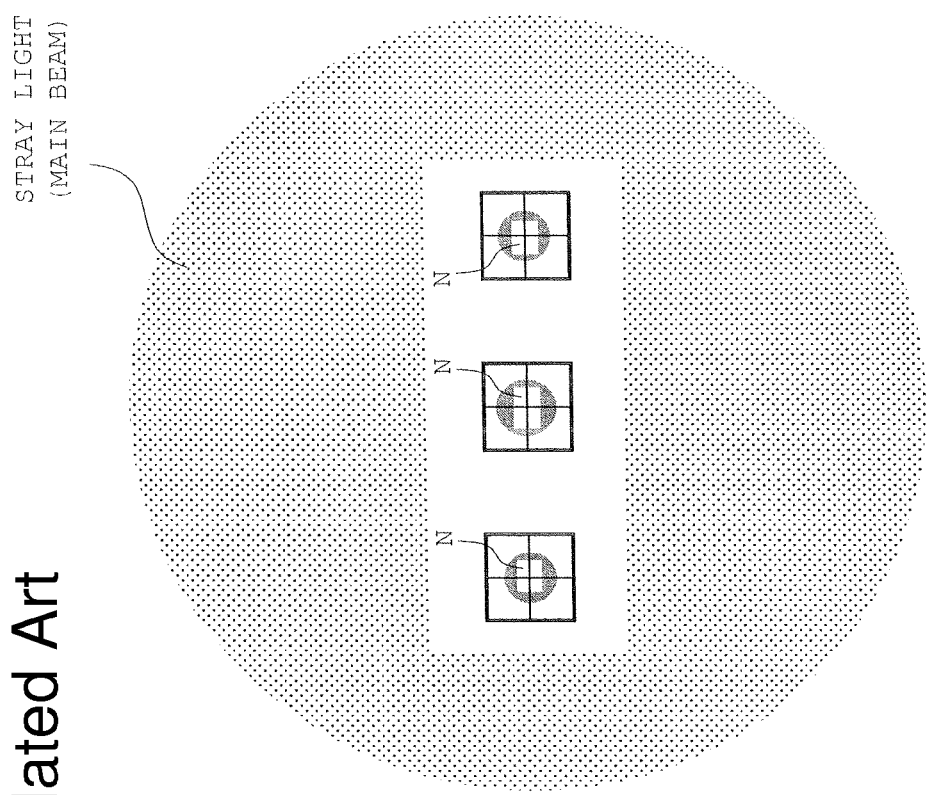

FIG. 1 shows a configuration of an optical pickup device according to a first embodiment of the present invention. In FIG. 1, the same components as those of the configuration example shown in FIG. 9 are designated by the same reference numerals, and the description thereof is omitted.

In the first embodiment, the beam splitter 13 is replaced with a polarization beam splitter 21, and a quarter-wave plate 22 is disposed in front of the objective lens 15. The polarization beam splitter 21 is disposed so as to substantially totally transmit the laser beam incident from the side of the semiconductor laser 11. A polarized direction of the light beam reflected from the optical disk is rotated by 90 degrees by the action of the quarter-wave plate 22 as compared with the light beam emitted from the light source. Therefore, the reflected light beam is substantially totally reflected by the polarization beam splitter 21. The quarter-wave plate 22 may integrally be disposed in the lens holder holding the objective lens.

Additionally, two reflecting mirrors 23 and 24 and a condenser lens 25 are disposed in the present embodiment. The light beam reflected by the polarization beam splitter 21 is reflected by the two reflecting mirrors 23 and 24 such that the traveling direction is bent by 90°, and is then condensed by the condenser lens 25. In FIG. 1, a broken line indicates the stray light beam from an L0 layer when an L1 layer is the target recording layer, and an alternate long and short dash line indicates the stray light beam from the L1 layer when the L0 layer is the target recording layer. A solid line indicates the signal light beam.

The reflecting mirror 23 is disposed such that a mirror surface is located at the focal position of the stray light beam from the L0 layer, and the reflecting mirror 24 is disposed such that a mirror surface is located at the focal position of the stray light beam from the L1 layer. In the mirror surfaces of the reflecting mirrors 23 and 24, pinholes 23a and 24a from which the mirror surfaces are removed are made in a region where the stray light beam (stray light beam by the main beam) from the L0 layer converges and a region where the stray light beam (stray light beam by the main beam) from the L1 layer converges respectively. Accordingly, the stray light beam from the L0 layer and the stray light beam from the L1 layer pass through the pinholes 23a and 24a, and are completely removed with respect to the signal light beam (light beam reflected from the target recording layer). As a result, the stray light beam is not incident on the photodetector 17, but only the signal light beam is incident on the photodetector 17.

The lower portion of FIG. 1 shows states of convergent spots of the main beam and sub-beams on the light receiving surfaces of the photodetector 17. Because the signal light beams of the main beam and sub-beams partially pass through the pinholes 23a and 24a respectively, light missing portions P are generated in the convergent spots of these beams as shown in the lower portion of FIG. 1. However, since the regions where the signal light beams are incident on the reflecting mirrors 23 and 24 sufficiently spread at the positions where the pinholes 23a and 24a are made, the area of the light missing portions P is extremely smaller than the area of the whole convergent spots. Therefore, the light missing portions P have little influence on the focus error signal and the tracking error signal.

Figure 2B:
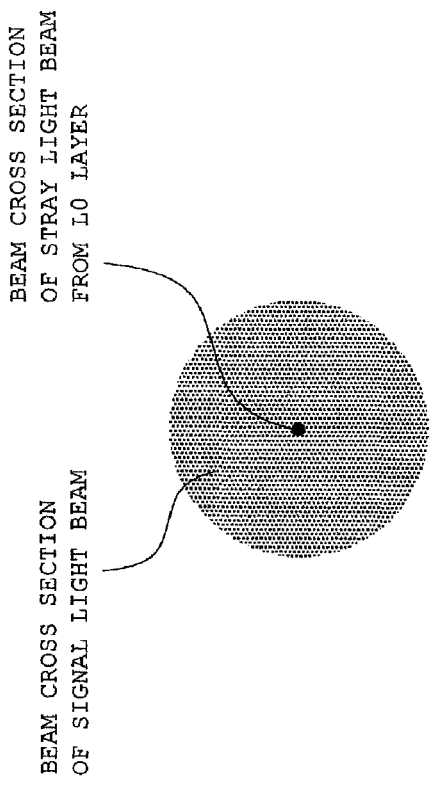
FIGS. 2A, 2B, and 2C are diagrams illustrating optical features of a signal light beam and a stray light beam according to the first embodiment.
Figure 2C:
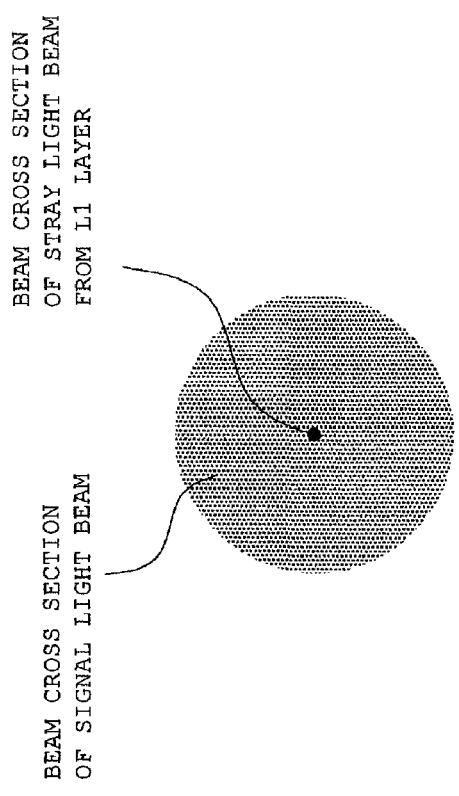
Figure 2A:
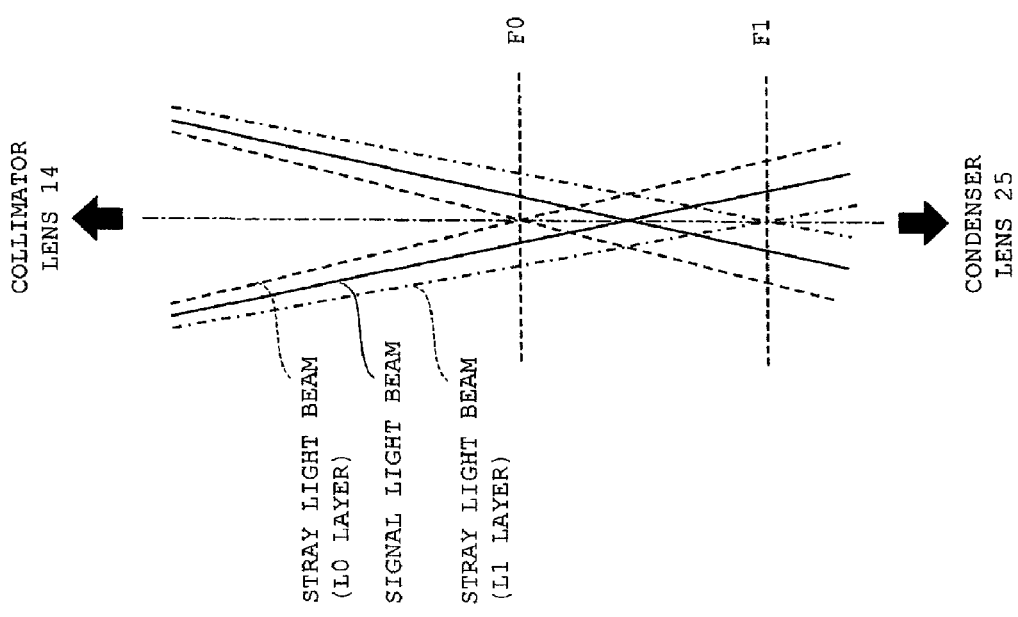

FIGS. 2A, 2B, and 2C show optical features of the signal light beam and stray light beam. As shown in FIG. 2A, the focal point of the stray light beam from the L0 layer, the focal point of the signal light beam, and the focal point of the stray light beam from the L1 layer are sequentially located from the side of the collimator lens 14 toward the condenser lens 25. FIGS. 2B and 2C show a beam cross section at a focal position (F0) of the stray light beam from the L0 layer and a beam cross section at a focal position (F1) of the stray light beam from the L1 layer respectively. As shown in FIGS. 2B and 2C, in both the beam cross sections, the signal light beam sufficiently spreads as compared with the focal spot of the stray light beam. Therefore, as described above, even if stray light removing means such as the pinhole is provided at the focal position of the stray light beam, the stray light removing means has an extremely little influence on the light quantity of the signal light beam.

Figure 16:
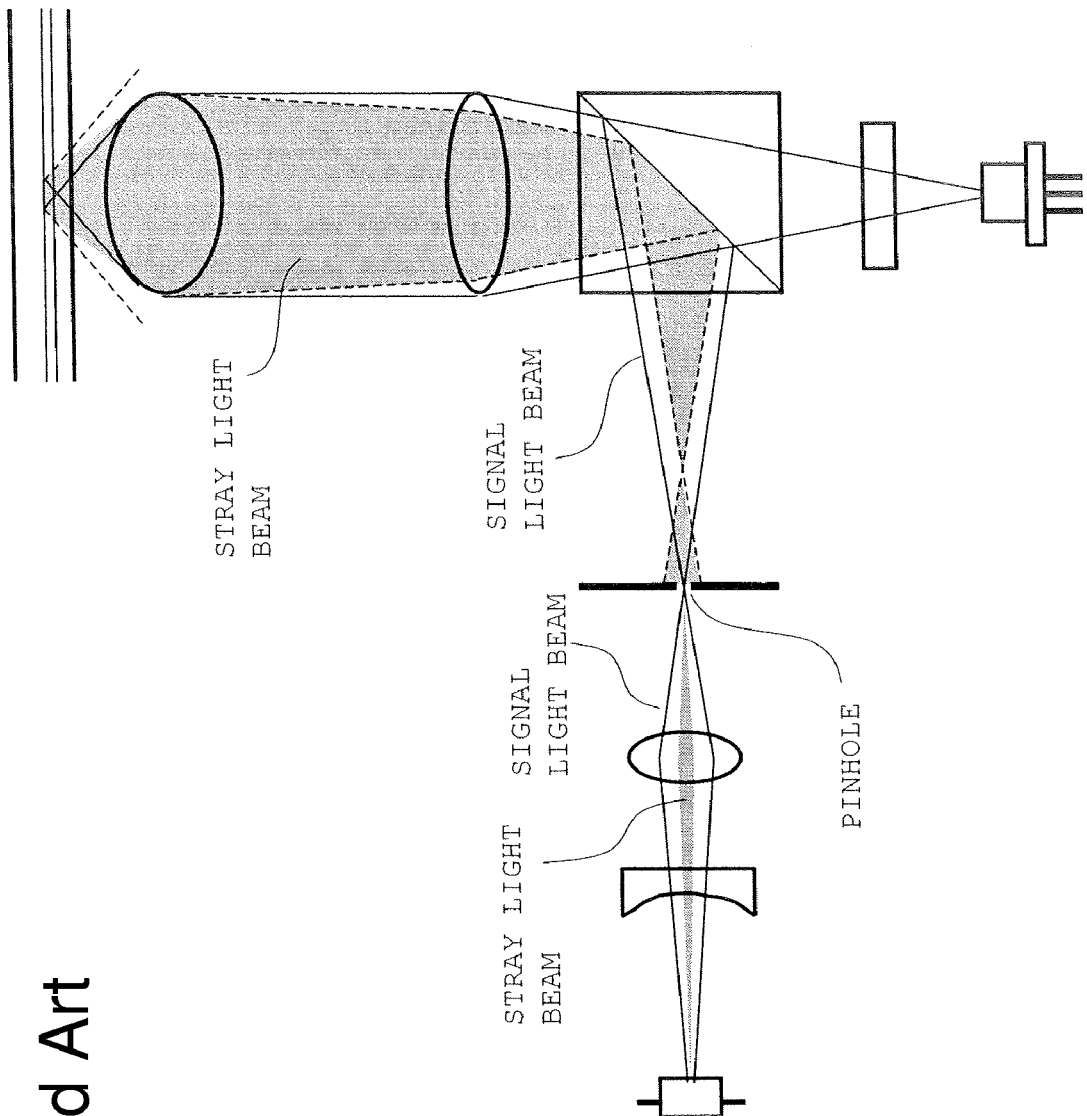
FIG. 16 is a diagram illustrating a stray light beam suppression technique according to the related art.
Figure 17A:
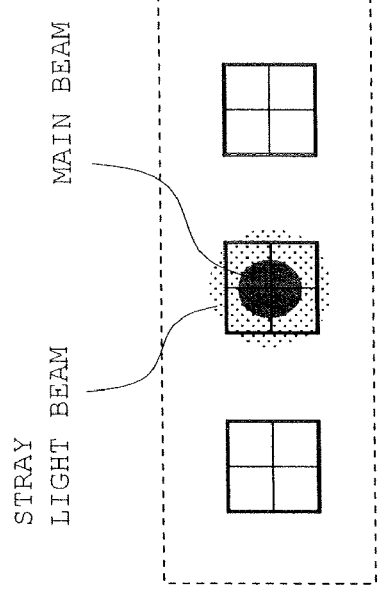
FIGS. 17A and 17B are diagrams illustrating the stray light beam suppression technique according to the related art.
Figure 17B:
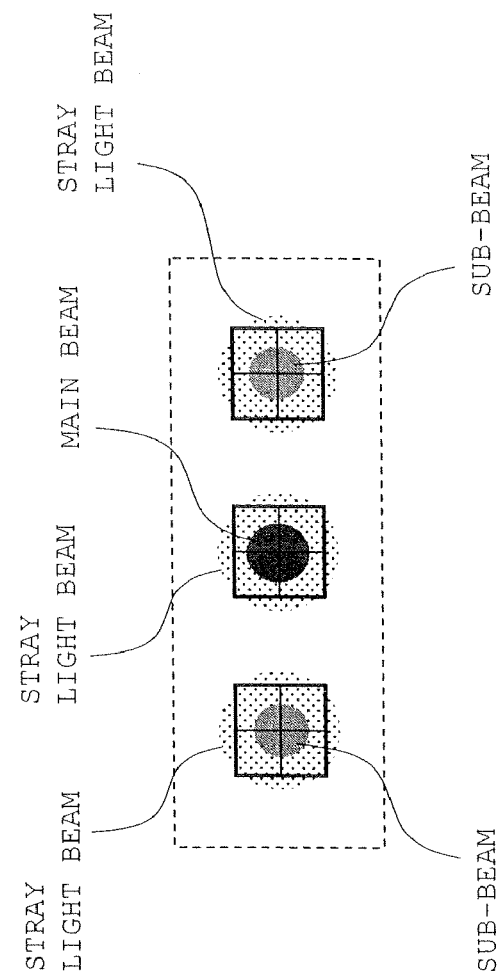

According to the first embodiment, because the stray light beam is completely removed before being incident on the photodetector 17, the influence of the stray light beam on the focus error detection and tracking error detection can be suppressed. Because the pinholes 23a and 24a may be aligned with the focal position of the stray light beam from the main beam, the adjustment is facilitated between the pinholes 23a and 24a and the focal position of the stray light beam as compared with the case disclosed in FIG. 16. In the present embodiment, only one of the pinholes 23a and 24a for the stray light beam from the main beam may be made in the mirror surface of the reflecting mirror 23 or 24, and the pinhole may be aligned with the focal position of the stray light beam from the main beam. In this case, although the stray light beam from the sub-beam is incident on the photodetector 17, because this stray light beam has extremely weak intensity as described above, a problem hardly occurs even if the stray light beam is incident on the light receiving surface of the photodetector 17. Further, according to the first embodiment, because it is only necessary that the mirror in which the pinhole is made be disposed, there is an advantage that the stray light beam can smoothly be removed without the need for a special optical component while using a simple and inexpensive optical component. The pinholes 23a and 24a may be replaced with a light shielding/attenuating member.

Second Embodiment

Figure 3:
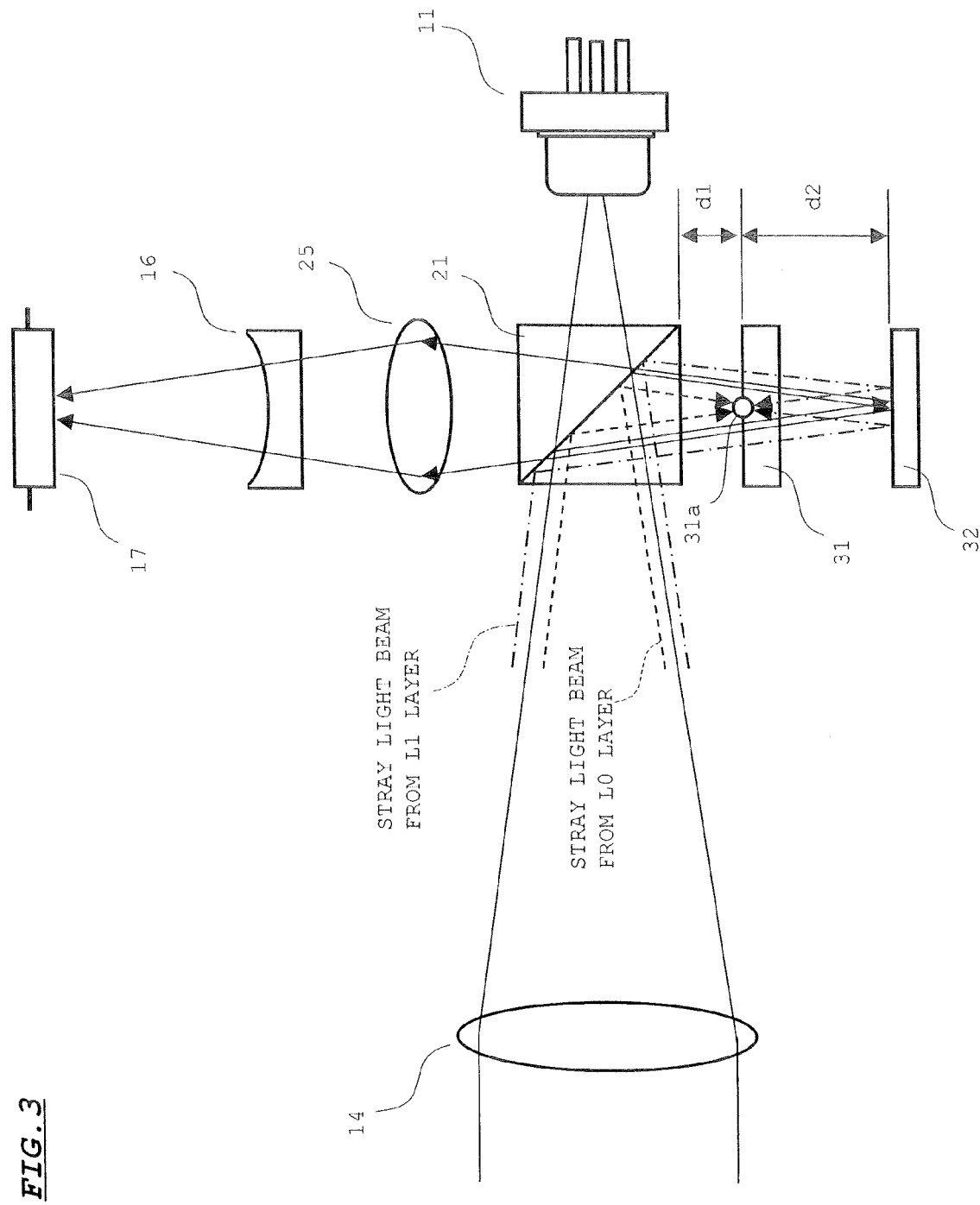
FIG. 3 shows a configuration of an optical pickup device according to a second embodiment of the present invention.

FIG. 3 shows a configuration of an optical pickup device according to a second embodiment of the present invention. FIG. 3 shows only a configuration corresponding to the rectangular portion surrounded by a dotted line T of FIG. 1. Other components are similar to those of FIG. 1, and thus are not shown in FIG. 3 (the same holds true in all the following embodiments).

In the second embodiment, the polarization beam splitter 21 is arranged such that the light beam reflected from the optical disk is reflected in the opposite direction to the photodetector 17. A quarter-wave plate 31 and a reflecting mirror 32 are disposed in an optical path of the laser beam after the light beam is reflected by the polarization beam splitter 21. The light beam reflected by the polarization beam splitter 21 is converted into a circularly polarized light beam by passing through the quarter-wave plate 31, and the light beam is reflected by the reflecting mirror 32. Then, the light beam passes through the quarter-wave plate 31 again, and is converted into a linearly polarized light beam orthogonal to the polarized direction in which the light beam travels from the polarization beam splitter 21 toward the reflecting mirror 32. Therefore, the light beam reflected by the reflecting mirror 32 is substantially transmitted through the polarization beam splitter 21 and guided to the photodetector 17.

A distance d1 between the quarter-wave plate 31 and the polarization beam splitter 21 is set such that the focal position of the stray light beam from the L0 layer is located in a surface of the quarter-wave plate 31 on the side of the polarization beam splitter 21. A distance d2 between the surface and the reflecting mirror 32 is set such that the focal position of the stray light beam from the L1 layer is located in the surface of the quarter-wave plate 31 on the side of the polarization beam splitter 21. That is, both the focal position of the stray light beam from the L0 layer and the focal position of the stray light beam from the L1 layer are located in the surface of the quarter-wave plate 31 on the side of the polarization beam splitter 21 by setting the distances d1 and d2 in the above-described manner.

In the present embodiment, a spot-like light shielding/attenuating member 31a is formed in the convergent region of the two stray light beams on the quarter-wave plate 31. Accordingly, both the stray light beam from the L0 layer and the stray light beam from the L1 layer are shielded and attenuated by the light shielding/attenuating member 31a and removed with respect to the signal light beam (light beam reflected from the target recording layer). As a result, the stray light beam is not incident on the photodetector 17, but only the signal light beam is incident on the photodetector 17.

Because the signal light beams of the main beam and sub-beams partially pass through the light shielding/attenuating member 31a, light missing portions P are generated at the convergent spots of these beams as shown in the lower portion of FIG. 1. However in this case also, as with the first embodiment, because the regions where the signal light beams are incident on the surface of the quarter-wave plate 31 sufficiently spread as compared with the region where the light shielding/attenuating member 31a is formed, the area of the light missing portions P become extremely smaller than the area of the whole convergent spots. Therefore, the light missing portions P have little influence on the focus error signal and tracking error signal.

According to the present embodiment, as with the first embodiment, the stray light beam can smoothly be removed. In the present embodiment, there is an advantage that the stray light beam from the L0 layer and the stray light beam from the L1 layer can simultaneously be removed by the single light shielding/attenuating member 31a. Therefore, compared with the first embodiment, the number of components can be reduced and the configuration can be simplified.

Third Embodiment

Figure 4:
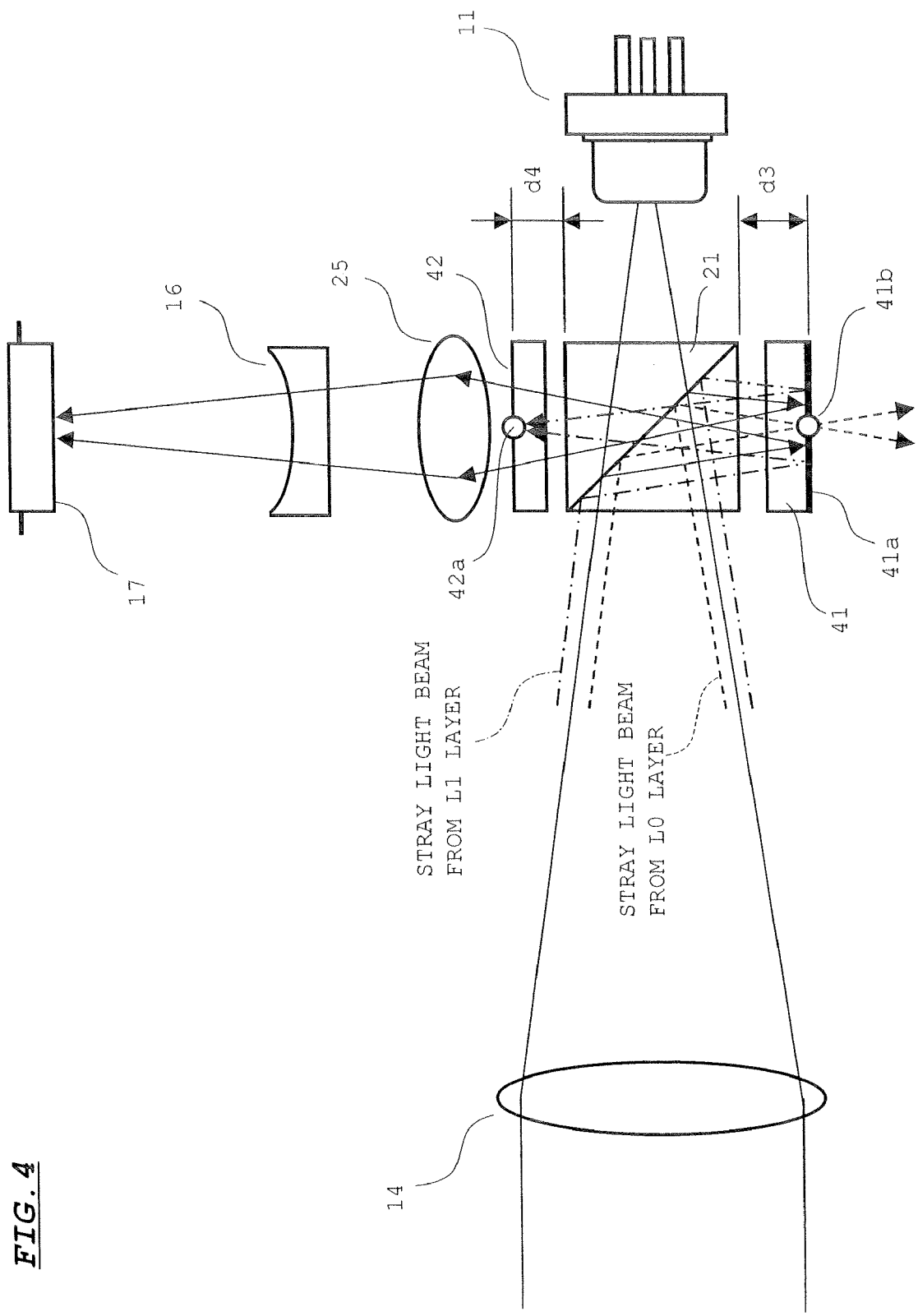
FIG. 4 shows a configuration of an optical pickup device according to a third embodiment of the present invention.

FIG. 4 shows a configuration of an optical pickup device according to a third embodiment of the present invention. In the third embodiment, a quarter-wave plate 41 having a total reflection plane 41a and a pinhole 41b is disposed in an optical path of the light beam reflected by the polarization beam splitter 21, and a transparent substrate 42 in which a light shielding/attenuating member 42a is formed in a spot-like shape is disposed in an optical path between the polarization beam splitter 21 and the photodetector 17.

A distance d3 between the polarization beam splitter 21 and the total reflection plane 41a is set such that the focal position of the stray light beam from the L0 layer is located on the total reflection plane 41a, and the pinhole 41b is made so as to cover the convergent spot of the stray light beam. A distance d4 between the polarization beam splitter 21 and the transparent substrate 42 is set such that the focal position of the stray light beam from the L1 layer is located in a surface of the transparent substrate 42 on the side of the photodetector 17, and the light shielding/attenuating member 42a is provided in the convergent region of the stray light beam on the surface.

In the present embodiment, the stray light beam from the L0 layer is completely removed with respect to the signal light beam (light beam reflected from the target recording layer) by passing through the pinhole 41b. The stray light beam from the L1 layer is removed with respect to the signal light beam by the light shielding/attenuating member 42a. According to the present embodiment, the stray light beam incident on the photodetector 17 is suppressed and only the signal light beam is incident on the photodetector 17.

In the present embodiment, as shown in the lower portion of FIG. 1, although light missing portions P are also generated in the convergent spots of the signal light beams of the main beam and sub-beams, the area of the light missing portions P becomes extremely smaller than the area of the whole convergent spots as in the first and second embodiments. Therefore, the light missing portions P have little influence on the focus error signal detection and the tracking error signal detection.

In the present embodiment also, as with the first embodiment, the stray light beam can smoothly be removed. When compared with the second embodiment, the third embodiment has an advantage in that a space necessary for the optical system can be reduced on the side of the quarter-wave plate 41. Therefore, the optical system can be miniaturized as compared with the second embodiment. The pinhole 41b may be replaced with a light shielding/attenuating member.

Fourth Embodiment

Figure 5:
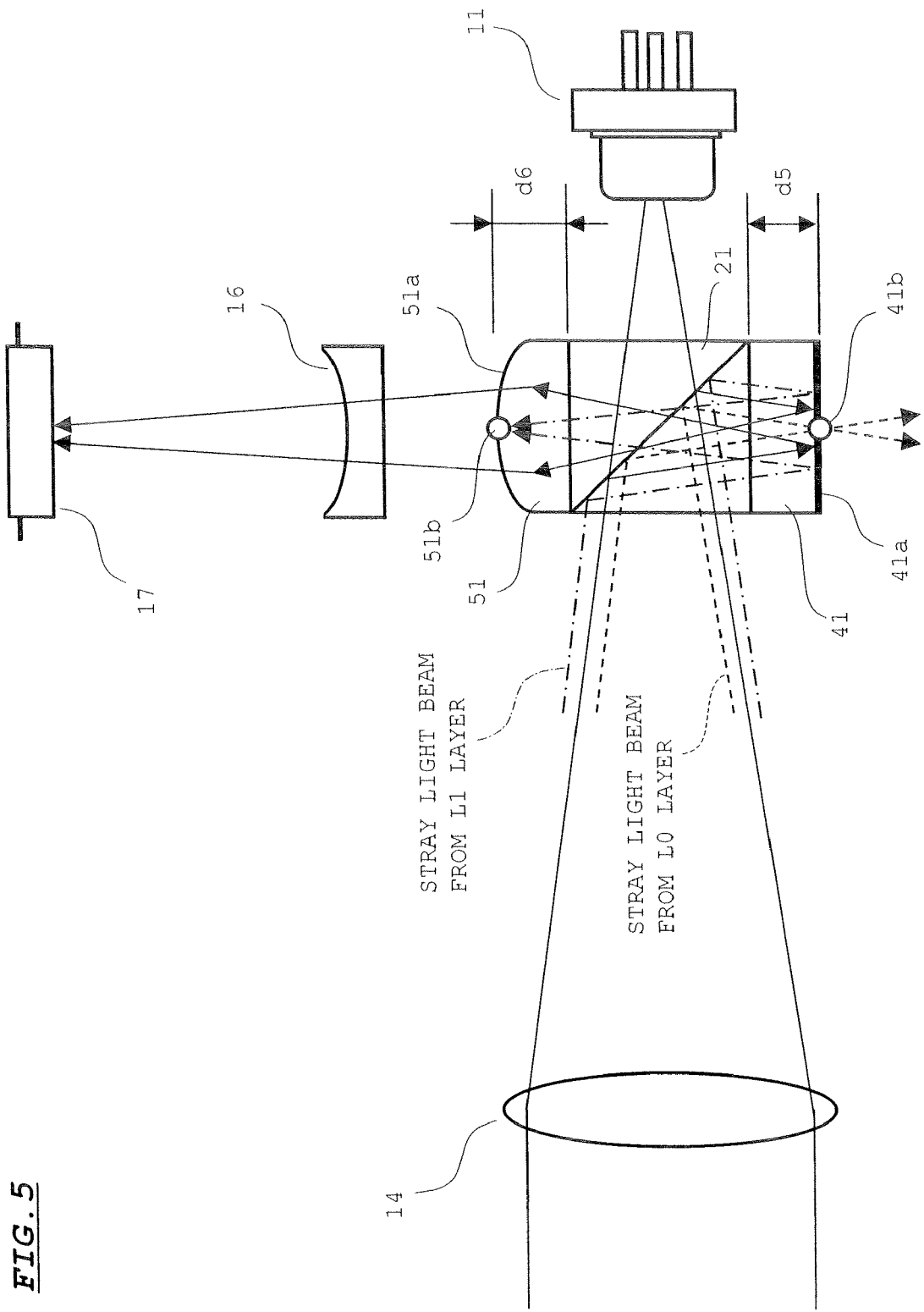
FIG. 5 shows a configuration of an optical pickup device according to a forth embodiment of the present invention.

FIG. 5 shows a configuration of an optical pickup device according to a fourth embodiment of the present invention. In the fourth embodiment, the optical components in the third embodiment are integrated.

That is, the polarization beam splitter 21, quarter-wave plate 41, transparent substrate 42, and condenser lens 25 of the third embodiment are integrated in the fourth embodiment. Specifically, the quarter-wave plate 41 is bonded to a lower surface of the polarization beam splitter 21, and a planoconvex lens 51 in which the transparent substrate 42 and condenser lens 25 of the third embodiment are integrated is bonded to an upper surface of the polarization beam splitter 21.

Similarly to the distance d3 of FIG. 4, a distance d5 between the lower surface of the polarization beam splitter 21 and the total reflection plane 41a is set such that the focal position of the stray light beam from the L0 layer is located at the position where the pinhole 41b is made. Because a quarter-wave plate in which a polarization control sheet adheres onto a transparent substrate exists in commercially available quarter-wave plates, the distance d5 can be set by appropriately adjusting the thickness of the transparent substrate or the size (length of one side) of the polarization beam splitter 21.

In the planoconvex lens 51, the surface on the side of the photodetector 17 constitutes a convex lens surface 51a, and a light shielding/attenuating member 51b is formed at the top of the convex lens surface 51a. Similarly to the distance d4 of FIG. 4, a distance d6 between the upper surface of the polarization beam splitter 21 and the top of the convex lens surface 51a is set such that the focal position of the stray light beam from the L1 layer is located at the position where the light shielding/attenuating member 51b is formed. A condensing characteristic of the planoconvex lens 51 can be adjusted by changing the curvature of the convex lens surface 51a.

The same effects as those of the third embodiment are obtained in the present embodiment. Additionally, according to the present embodiment, the distances d5 and d6 are fixed to proper values at a component production stage. Advantageously, positional accuracy is improved with respect to the pinhole 41b and the light shielding/attenuating member 51b, and the optical component disposing work is simplified. As with the third embodiment, the pinhole 41b may be replaced with a light shielding/attenuating member.

Fifth Embodiment

A fifth embodiment has a configuration in which all the stray light removing means are disposed on the side of the photodetector 17. Specifically, a configuration shown in FIG. 7 or 8 is disposed in the region surrounded by a broken line V of FIG. 6. Because the whole optical system subsequent to the polarization beam splitter 21 is located on the side of the photodetector 17 in both cases of FIGS. 7 and 8, the arrangement of the optical components can be adjusted in the same direction with the photodetector 17 as the starting point. Therefore, compared with the second and fourth embodiments, the present embodiment has an advantage in that the optical system adjusting work becomes simplified.

Figure 6:
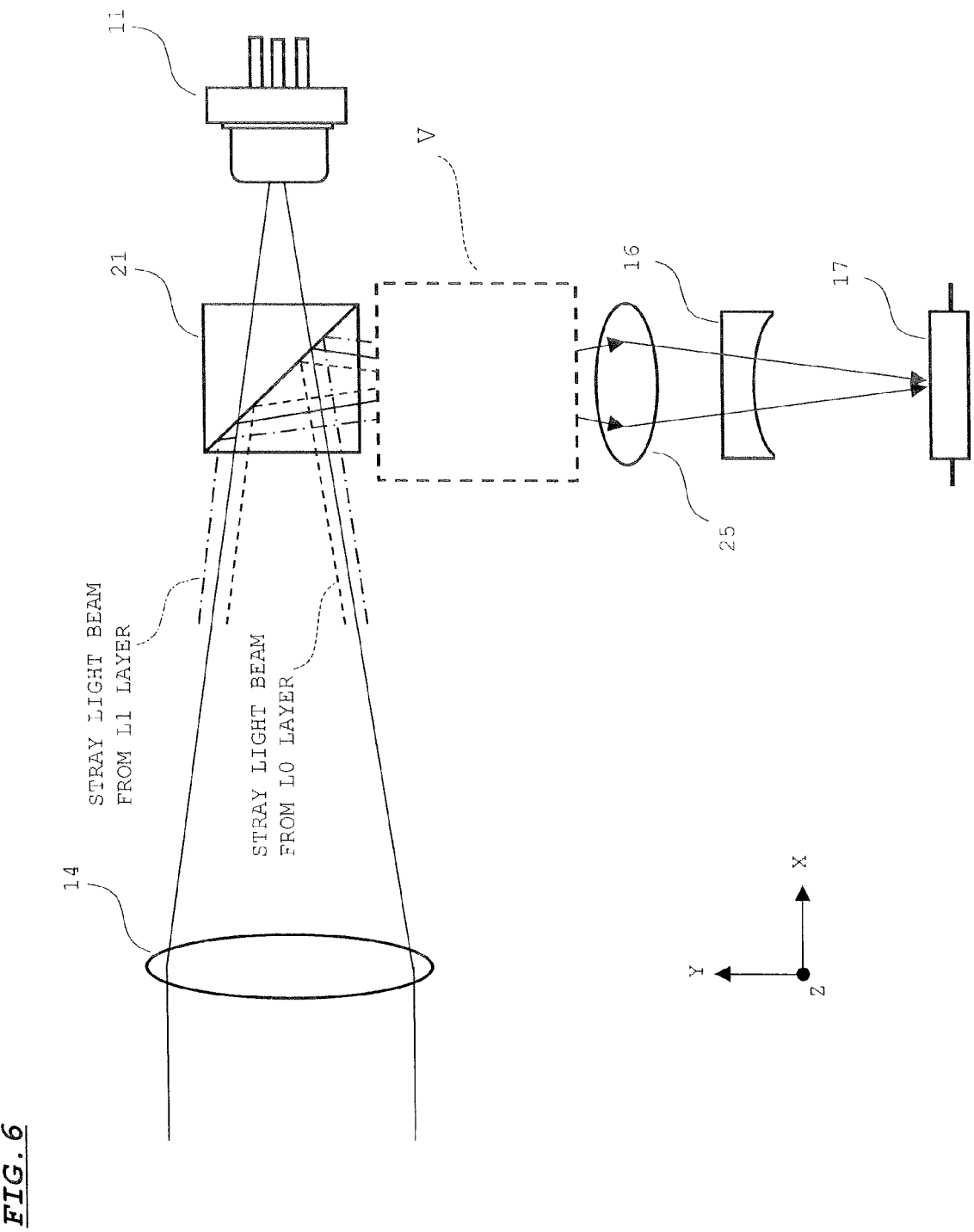
FIG. 6 shows a configuration of an optical pickup device according to a fifth embodiment of the present invention.
Figure 7:
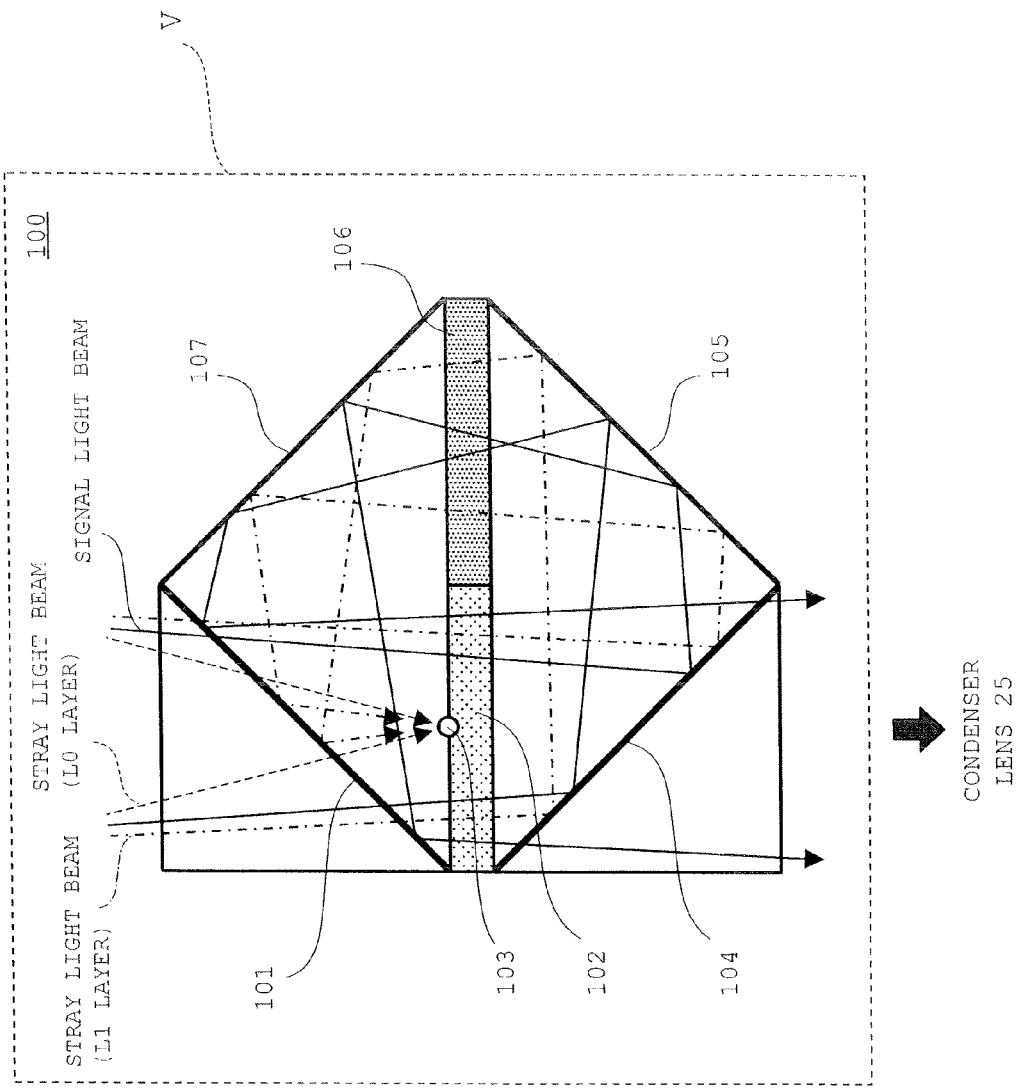
FIG. 7 shows a specific configuration example of the optical pickup device according to the fifth embodiment.
Figure 8:
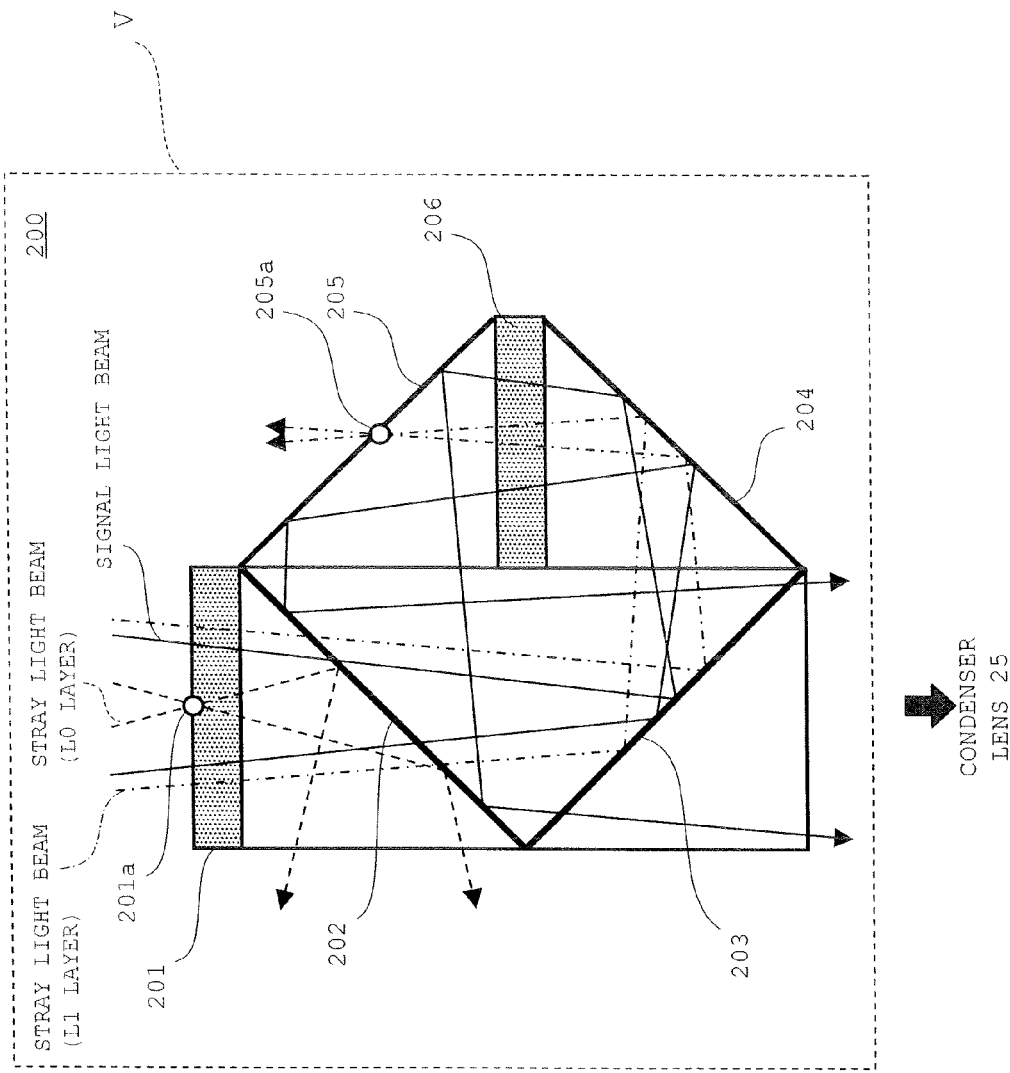
FIG. 8 shows a specific configuration example of the optical pickup device according to the fifth embodiment.

FIG. 7 shows a configuration example of the region surrounded by the broken line V of FIG. 6. In this configuration example, an optical prism 100 shown in FIG. 7 is disposed in the region surrounded by the broken line V of FIG. 6. FIG. 7 shows the optical prism 100 disposed in the optical system when viewed in a Z-axis direction of FIG. 6.

A first plane of polarization 101, a second plane of polarization 104, and two total reflection planes 105 and 107 are disposed in the optical prism 100. A transparent substrate layer 102 having a spot-like light shielding/attenuating member 103 is disposed between the first plane of polarization 101 and the second plane of polarization 104, and a half-wave plate 106 is disposed between the two total reflection planes 105 and 107.

The light beam reflected from the disk is incident from the side of the polarization beam splitter 21, and is substantially totally transmitted through the first plane of polarization 101. The light beam transmitted through the first plane of polarization 101 is substantially totally reflected from the second plane of polarization 104 in such a direction that the light beam is bent by 90 degrees. The light beam reflected by the second plane of polarization 104 is totally reflected in the direction in which the light beam is bent by 90 degrees from the two total reflection planes 105 and 107 respectively. At this point, the polarized direction of the reflected light beam is rotated by 90 degrees when the light beam passes through the half-wave plate 106. Therefore, the light beam which is incident on the first plane of polarization 101 again after being reflected by the total reflection plane 107 is substantially totally reflected by the first plane of polarization 101, is further substantially totally transmitted through the second plane of polarization 104, and is guided to the condenser lens 25.

The first and second planes of polarization 101 and 104 and the two total reflection planes 105 and 107 are disposed such that the focal position of the stray light beam from the L0 layer and the focal position of the stray light beam from the L1 layer, which is caused to converge gradually while itinerating in the optical prism 100, are made coincident with each other. The spot-like light shielding/attenuating member 103 formed on the transparent substrate layer 102 is disposed at the common focal position of the stray light beams from the L0 layer and L1 layer so as to simultaneously cover the convergent regions of these stray light beams.

According to this configuration example, because the optical prism 100 of FIG. 7 is disposed between the polarization beam splitter 21 and the condenser lens 25, the stray light beam incident on the photodetector 17 can smoothly be suppressed, and only the signal light beam can be guided to the photodetector 17. Additionally, according to this configuration example, both the stray light beam from the L0 layer and the stray light beam from the L1 layer can be shielded and attenuated by the single light shielding/attenuating member 103.

FIG. 8 shows another configuration example of the region surrounded by the broken line V of FIG. 6. In this configuration example, an optical prism 200 shown in FIG. 8 is disposed in the region surrounded by the broken line V of FIG. 6. FIG. 8 shows the optical prism 200 disposed in the optical system when viewed in the Z-axis direction of FIG. 6.

As with the configuration of FIG. 7, a first plane of polarization 202, a second plane of polarization 203, and two total reflection planes 204 and 205 are disposed in the optical prism 200. A half-wave plate 201 in which the function of the half-wave plate is removed in a spot-like shape from a spot region 201a is disposed in front of the first plane of polarization 202, and a half-wave plate 206 is disposed between the two total reflection planes 204 and 205. Further, a pinhole 205a is made in the total reflection plane 205.

The light beam reflected from the disk is incident on the half-wave plate 201, and the half-wave plate 201 rotates the plane of polarization of the light beam by 90 degrees. Then, the first plane of polarization 202 substantially totally transmits the light beam, and the second plane of polarization 203 substantially totally reflects the light beam in such a direction that the light beam is bent by 90 degrees. Then, the two total reflection planes 204 and 205 totally reflect the light beam reflected by the second plane of polarization 203 in the direction in which the light beam is bent by 90 degrees. At this point, the polarized direction of the reflected light beam is rotated by 90 degrees when the reflected light beam passes through the half-wave plate 206. Therefore, the reflected light beam which is incident on the first plane of polarization 202 again after being reflected by the total reflection plane 205 is substantially totally reflected by the first plane of polarization 202, and is further substantially totally transmitted through the second plane of polarization 203.

The spot region 201a on the half-wave plate 201 is disposed at the focal position of the stray light beam so as to cover the convergent region of the stray light beam from the L0 layer. Therefore, the whole stray light beam is not affected by polarization rotation action of the half-wave plate 201, and the stray light beam reflected by the polarization beam splitter 21 is incident on the first plane of polarization 202 while maintaining the polarized direction. This enables the whole stray light beam to be reflected by the first plane of polarization 202. Accordingly, the stray light beam from the L0 layer is removed from the signal light beam (light beam reflected from the target recording layer).

The pinhole 205a in the total reflection plane 205 is disposed at the focal position of the stray light beam from the L1 layer so as to cover the convergent region of this stray light beam. This enables the whole stray light beam to pass through the pinhole 205a. Accordingly, the stray light beam from the L1 layer is removed from the signal light beam (light beam reflected from the target recording layer).

According to this configuration example, because the optical prism 200 of FIG. 8 is disposed between the polarization beam splitter 21 and the condenser lens 25, the stray light beam incident on the photodetector 17 can smoothly be suppressed, and only the signal light beam can be guided to the photodetector 17. The spot region 201a or the pinhole 205a may be replaced with a light shielding/attenuating member.

In the configurations of FIGS. 7 and 8, as with the first and fourth embodiments, although part of the signal light beam is removed by the light shielding/attenuating member 103, the pinhole 205a or the like, the decrease in light quantity of the signal light beam can be suppressed to an extremely small level. Therefore, the decrease in light quantity has little influence on the focus error signal and the tracking error signal.

Although various preferred embodiments of the present invention are described above, the present invention is not limited to these embodiments. Obviously, the scope of the present invention is defined only by the technical idea defined in the appended claims.

Examples of the light shielding/attenuating member used in the above embodiments include a resin material which absorbs or diffuses the laser beam having a wavelength band emitted from the semiconductor laser 11, a metal, and an incident angle filter structure having transmittance distribution dependent on an incident angle.

The present invention can be applied to any optical pickup device which can deal with a recording medium having a plurality of recording layers. The present invention can appropriately be applied to the optical pickup devices mounted on drive devices such as existing DVDs and CDs in addition to next-generation DVDs.

The present invention is particularly suitable for three-beam type optical pickup devices (according to the differential push-pull method and the differential astigmatic method) in which a laser beam is separated into a main beam and sub-beams by a diffraction grating, and the present invention can appropriately be used as a countermeasure against stray light beams in one-beam type optical pickup devices.

It should be understood that various changes and modifications can appropriately be made in the embodiments according to the present invention without departing from the scope of the technical idea defined in the appended claims.

What is claimed is:

1. An optical pickup device for irradiating an optical disk having a plurality of recording layers in a laminated direction with a laser beam, comprising:

a light source which emits the laser beam;

an objective lens which causes the laser beam emitted from the light source to converge onto a target recording layer among the plurality of recording layers;

a beam branching element which separates the laser beam emitted from the light source and reflected light beams reflected by the recording layers;

a photodetector for receiving the reflected light beam from the target recording layer; and an optical element disposed at a focal position of a stray light beam which is the reflected light beam from the recording layer except the target recording layer, on an optical path between the beam branching element and the photodetector to remove or attenuate the reflected light beams in a convergent region of the stray light beam in the incident reflected light beams, wherein an optical system from the light source to the objective lens is configured such that a polarization state of the reflected light beam separated by the beam branching element becomes a linearly polarization, optical means including a first plane of polarization, a second plane of polarization, a first reflection plane, a second reflection plane and a wavelength plate along a traveling path of the reflected light beam separated by the beam branching element is disposed, the wavelength plate changing the polarization direction of the reflected light beam by 90 degrees, the optical means is configured such that the reflected light beam incident through the first plane of polarization passes through the second plane of polarization, the first reflection plane and the second reflection plane, passes through the first plane of polarization again, and is guided in a direction from the second plane of polarization toward the photodetector, the optical means being disposed such that focal positions of the first and second stray light beams guided respectively from different two of the recording layers are coincident with each other on an optical path between the first plane of polarization and the second plane of polarization, and the optical element is disposed at the common focal position of the first and second stray light beams.

2. An optical pickup device for irradiating an optical disk having a plurality of recording layers in a laminated direction with a laser beam, comprising:

a light source which emits the laser beam;

an objective lens which causes the laser beam emitted from the light source to converge onto a target recording layer among the plurality of recording layers;

a beam branching element which separates the laser beam emitted from the light source and reflected light beams reflected by the recording layers;

a photodetector for receiving the reflected light beam from the target recording layer; and an optical element disposed at a focal position of a stray light beam which is the reflected light beam from the recording layer except the target recording layer, on an optical path between the beam branching element and the photodetector to remove or attenuate the reflected light beams in a convergent region of the stray light beam in the incident reflected light beams, wherein an optical system from the light source to the objective lens is configured such that a polarization state of the reflected light beam separated by the beam branching element becomes a linearly polarization, optical means including a first plane of polarization, a second plane of polarization, a first reflection plane, a second reflection plane, and a wavelength plate along a traveling path of the reflected light beam separated by the beam branching element is disposed, the wavelength plate changing the polarization direction of the reflected light beam by 90 degrees, the optical means is configured such that the reflected light beam incident through the first plane of polarization passes through the second plane of polarization, the first reflection plane and the second reflection plane, passes through the first plane of polarization again, and is guided in a direction from the second plane of polarization toward the photodetector, the optical means being disposed such that focal positions of the first and second stray light beams guided respectively from different two of the recording layers are placed on an optical path between the beam branching element and the first plane of polarization and one of the second plane of polarization, the first reflection plane, and the second reflection plane, and the optical elements are disposed at the focal positions of the first and second stray light beams respectively.

3. The optical pickup device according to claim 2, wherein the optical element disposed on the optical path between the beam branching element and the first plane of polarization is formed by a polarization converting element which causes the reflected light beam in the convergent region and the reflected light beam in another region to be different from each other in polarized direction.

* * * * *